United States Patent [19]
Furr

[11] Patent Number: 5,334,973
[45] Date of Patent: Aug. 2, 1994

[54] LEAK DETECTION AND SHUT-OFF APPARATUS

[76] Inventor: Mark A. Furr, P.O. Box 1393, Derry, N.H. 03038

[21] Appl. No.: 830,937

[22] Filed: Feb. 4, 1992

[51] Int. Cl.$^5$ .................................. G08B 21/00
[52] U.S. Cl. .................................. 340/605; 340/604; 200/61.05
[58] Field of Search ............ 340/604, 605, 647; 73/49.2 T, 40.5 R; 122/507; 126/388; 200/61.04, 61.05; 137/312

[56] References Cited

U.S. PATENT DOCUMENTS

| | | | |
|---|---|---|---|
| 3,473,553 | 10/1969 | Collins | 137/312 |
| 4,110,739 | 8/1978 | Kidd | 73/49.2 X |
| 4,126,857 | 11/1978 | Lancia et al. | 340/620 |
| 4,297,686 | 10/1981 | Tom | 340/604 |
| 4,418,712 | 12/1983 | Braley | 340/604 X |
| 4,738,260 | 4/1988 | Brown | 340/604 X |
| 4,805,662 | 2/1989 | Moody | 200/61.04 X |
| 4,845,472 | 7/1989 | Gordon et al. | 340/605 |
| 4,876,530 | 10/1989 | Hill et al. | 340/605 |
| 4,974,739 | 12/1990 | Gelin | 73/49.2 |
| 5,008,650 | 4/1991 | Hoiberg | 340/604 |
| 5,029,605 | 7/1991 | Dowling et al. | 200/61.04 X |

*Primary Examiner*—Jeffery A. Hofsass
*Attorney, Agent, or Firm*—William B. Ritchie

[57] ABSTRACT

A leak detection and shut-off apparatus for preventing damage from leaking hot water tanks. The invention features a unique three-layered sensor that completes encases the hot water tank thus detecting the occurrence of leaks anywhere on the tank. Circuitry controls the sensor that provides for accurate detection of even small amounts of moisture so that any potential leak problems can be remedied before a major spill occurs. The device also features a water shut off control mechanism plus audible alarm in the event a leak is detected. The unit is powered by connecting it to 110 house current. A 9 volt battery back-up is provided in case of power failures.

9 Claims, 10 Drawing Sheets

LEAK DETECTION AND SHUT-OFF APPARATUS

BACKGROUND OF THE INVENTION

1. Field of the Invention

The invention relates to a water leak detecting apparatus.

2. Description of the Related Art

A long standing problem in the area of containers, particularly hot water tanks, is that if a leak or break were to occur in the tank, no practical means or methods exist for terminating the water input to the tank unless one is physically present at the time the leak initiates. An extended period of leakage may cause substantial damage to carpeting and flooring as well as ceilings, walls and furniture especially if the leak should occur on an upper floor of a multistory structure. Every year millions of dollars are lost in property damages and lost revenue to businesses due to hot water tank leaks.

U.S. Pat. No. 3,473,533, issued to T. H. Collins discloses an automatic water cut off water heaters that is a mechanical device that is not designed to sense a leak which occurs at the lateral sides or top of the hot water tank.

U.S. Pat. No. 4,126,857, issued to Lancia et al., discloses a probe-type liquid detector that has a limited area of sensor sensitivity. It utilizes a probe-type sensor that must rely on the water leakage from the hot water tank to flow where the sensor is place. The detector also has a test operation mode that will test the audible alarm of the detector but does not test the sensor circuitry of the detector.

U.S. Pat. No. 4,297,686, issued to Tom, discloses a water detection device with a combined extended probe liquid detection and shut-off system. A solenoid-type shut-off valve is utilized which is unsuitable for long term, unattended applications due to substantial electrical current drain required. The extended probe requires a slow, steady stream of water to activate the alarm. The probe will not detect small drops of surface water, often an early warning of a hot water tank leak.

U.S. Pat. No. 4,805,662, issued to Moody, discloses a hot water heater failure protection device with solenoid that senses accumulation of moisture or liquid below the tank, that is, in the so-called drip pan. The device utilizes a ground fault interrupter circuit which for its operation requires that the hot water failure system be continuously powered by a 110 volt alternating current. Accordingly the system presents a potential safety hazard and requires considerable cost in operating power.

U.S. Pat. No. 5,008,650, issued to Hoiberg, discloses the use of an elongated filament like sensor that is placed around the base of the hot water tank. This type of sensor is susceptible to dirt and dust which can impede the sensitivity. The system must also be turned off when cleaning the area where the sensor is located which requires remembering to turn the unit back on again.

U.S. Pat. No. 5,029,605, issued to Dowling et al., discloses a fluid vessel overflow system that is powered by an external electrical power source and utilizes a solenoid-type valve which will not function in the event of a power failure. The system does not provide an audible alarm or a visual alarm to notify the owner that water is leaking from the vessel. Since the solenoid is only actuated during a leak, deposits that can accumulate in pipes and valves over a period of time may impede the actuation of the solenoid-type valve and the stepdown transformer may not provide the electrical current required to overcome the impedance that deposits can cause.

A system that automatically detects leaks, activates an alarm in the building or at some other location and shuts off the water supply to the leaking hot water tank is not found in prior art.

SUMMARY OF THE INVENTION

It is an object of the invention to provide a leak detection and shut-off apparatus to prevent leakage of water from a hot water tank or conduit.

It is another object of the invention to provide a leak detection and shut-off apparatus to terminate the input water flow to a leaking hot water tank or conduit.

It is still another object of the invention to provide a leak detection and shut-off apparatus that is mounted on a water pipe or other conduit.

It is still an additional object of the invention to provide a leak detection and shut-off apparatus that is electrically powered but not hazardous to personnel in the vicinity of the device.

It is still another object of the invention to provide a leak detection and shut-off apparatus in which the alarm status indication including alarm triggered, alarm set and alarm off is given to the user.

It is still another object of the invention to provide a leak detection and shut-off apparatus that has an audible and visual alarm.

It is still another object of the invention to provide a leak detection and shut-off apparatus with external monitoring device triggering.

It is still another object of the invention to provide a leak detection and shut-off apparatus that can be powered by a fused wall adaptor or an internal battery pack as a back-up.

It is a final object of the invention to provide a device that possess internal electrical fusing.

The invention is a leak detection and shut-off apparatus for liquid containers. It features a three layer sensor. The first layer is adapted to be nonabsorbent and nonconductive in both wet and dry environments. This first layer is furthest from said container, thereby keeping moisture from said sensor and preventing false alarms. The second layer is closest to said container. This layer is adapted to be non-conductive when dry and conductive when in contact with moisture. The third layer of the sensor is sandwiched between said first and second layers. The third layer is adapted to be conductive having a resistance ranging from 0 to 2 megohms. A leak in said container will cause said sensor to produce a signal corresponding to said leak by completing an electrical circuit through said second and third layers.

DETAILED DESCRIPTION OF THE INVENTION

The present invention is an apparatus for detecting the presence of water, moisture or other electrically conductive liquids that may leak from a tank, particularly a hot water tank and then shutting off the source of water supply to that tank. The invention notifies the owner of a hot water tank leak through audibly by a buzzer; visually by a flashing light; also by a telephone auto-dialer; and through the absence of hot water flow. The invention has the following features incorporated into its design; alarm status indication, power source in use indication, low battery indication, external monitoring device triggering, test operation mode, battery or external power source, two year battery operation, battery backup and manual override. The invention also has the following safety features incorporated into its design; fused external wall adaptor power source, drive shaft rider movement limiting nuts, internal fusing, water valve position limiting circuits, control box position limiting circuit, control box position limiting arm and a low electrical current flow for sensor operation.

Figure 1:
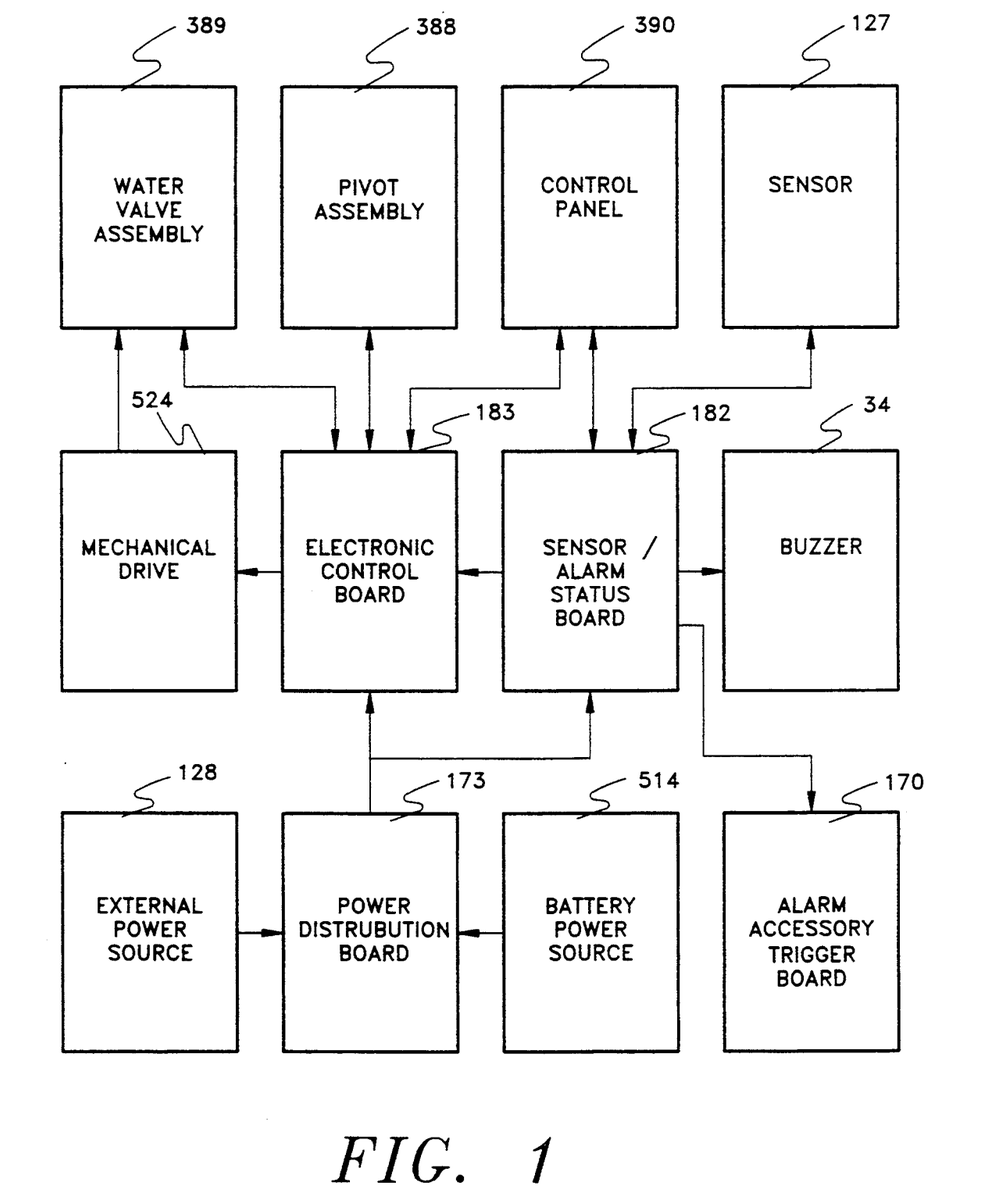
FIG. 1 is a block diagram of the principal component systems of the leak detection and shut-off apparatus in accordance with the invention.

As shown in the block diagram of FIG. 1, The invention comprises a control panel 390, pivot assembly 388, water valve assembly 389, sensor 127. external power source 128, sensor/alarm status board 182, electronic control board 183, power distribution board 173, alarm accessory trigger board 170, battery power source 514, mechanical drive system 524 and buzzer 34. The mechanical drive system 524 comprises a dc motor, rpm to torque gear assembly and a threaded rod drive shaft. A drive shaft rider which is connected to the mechanical handle of the water valve is moved when the threaded rod drive shaft rotates. This rotation actuates the water valve to open and closed positions.

Buzzer 34 is a piezo buzzer that provides an audible output of 90 decibels minimum. The function of the buzzer is to provide audible notification of an alarm condition.

The water valve assembly 389 comprises a ¼ turn ball valve, mechanical handle, manual handle and two lever switches. The mechanical handle is moved by the mechanical drive system and is detachable from the water valve to permit manual override of the water valve by means of the manual handle. Two lever switches are provided to determine water valve position and to limit movement of the water valve during mechanical actuation. The function of the ¼ turn ball valve assembly is to control input water flow into the hot water tank.

The pivot assembly 388 comprises a lever switch and a pivot platform which is anchored to a water pipe by two U-bolts. The pivot platform has a shaft that connects the control box assembly to the pivot assembly. The control box assembly pivots on this shaft when the ¼ turn ball valve is moved to open and closed positions by the mechanical drive system. A lever switch is provided to determine the control box assembly position and to stop water valve actuation.

The moisture sensor 127 is a multilayered sensor that completely incases the hot water tank liner, thus providing complete surface area coverage of the hot water tank liner. The moisture sensor comprises three material layers. The first layer is made of nonconductive material that becomes conductive when it absorbs moisture. The second sensor layer is made of conductive material having a resistance of 0 to 2 megohms. The third sensor layer is made of nonabsorbent material that is nonconductive when it is wet or dry. A conductive material, preferable copper foil, is soldered to one of the pipes that is connected to the hot water tank. An electrically conductive wire is connected from the copper foil to the sensor phone-type plug and another electrically conductive wire is connected from the moisture sensor conductive layer to the phone-type plug. The phone-type plug is inserted into the sensor phone-type jack of the control box assembly. When moisture leaks out of the hot water tank liner the first layer of the moisture sensor absorbs the moisture and puts the leaking moisture in contact with the electrically conductive layer of the moisture sensor. This event completes an electrical circuit that runs from the sensor circuit through the phone-type jack and plug, to the electrically conductive wire connected to the copper foil that is soldered to the water pipe. The water pipe is made of copper and it conducts electrical current to the water that is inside of the pipe. This water is electrically conductive and is in physical contact with the water that is located in the hot water tank liner. Electrical current then passes through the leaking hole of the hot water tank liner and through the absorbent layer of the moisture sensor to the electrically conductive layer of the sensor. The electrical current now flows from the electrically conductive moisture sensor layer to an electrically conductive wire that is connected to the phone-type plug which is connected to the phone-type jack and the sensor circuit of the control box assembly. This is an alarm condition that will activate the hot water tank leak alarm system. When a moisture sensor is configured in this manner, incasing the hot water tank liner any moisture that leaks from inside of the hot water tank liner will be detected. Since the hot water tank liner is hot, moisture can never develop on its outer surface and an alarm condition can only take place if water is leaking from inside of the hot water tank liner.

The fused external electrical power source 128 provides voltage and current to operate the present invention. This power source provides 12 volts and and 3 amps of current and is a wall transformer adaptor that is fused. The fuse provides safe operation of the present invention and is provided as a safety precaution in the event of an electrical failure that could cause damage to the hot water tank leak alarm or danger to persons in the vicinity of the invention. Internal electrical fusing, located on the control box assembly has been provided for extra safety.

The battery power source 514 is an internal 9 volt battery pack that is located inside of the control box assembly. This power source provides voltage and current to operate the present invention during battery operation or battery backup operation of the hot water tank leak alarm.

Control panel 390 comprises three switches and two light emitting diodes (LED). One switch controls the water valve position, another controls alarm operation status and the third activates a self test function. One LED displays the power source in use and the other displays alarm status and battery voltage status.

Sensor/alarm status board 182 senses an alarm condition and distributes signals to the control panel 390, electronic control board 183, alarm accessory trigger board 170 and buzzer 34. Alarm accessory trigger board 170 triggers external alarm monitoring devices and is controlled by the sensor/alarm status board 182. Electronic control board 183 senses the water valves position, control box position and controls the mechanical drive 524. Board 183 is controlled by the sensor/alarm status board 182 and the control panel 390.

Power distribution board 173 provides voltage and current to the electronic control board 183, sensor/alarm status board 182.

External power source 128 is preferably a wall transformer adapter having the following preferred characteristics: 12 volts DC at 3 amps current draw. External power source 128 preferably has independent output voltage connections with a common voltage return connection using a three conductor plug. Power source 128 supplies 18.5 to 20.0 volts DC when no circuit current load is connected to the output voltage connector. Power source 128 is preferably fused between the power transformer secondary output and the rectifier circuits. The function of the external power source 128 is to provide voltage and current to operate the alarm.

Battery power source 514 is preferably a 9 volt battery pack. The function of the battery power source 514 is to provide voltage and current to the alarm during the absence of external power.

Mechanical drive system 524 comprises a DC motor with gears connected to its armatures shaft to convert RPM to torque. The last gear of the torque gear assembly is secured to a threaded rod drive shaft. A drive shaft rider that has a threaded hole through it like a nut which permits it to move along the length of the drive shaft as it rotates. The drive shaft rider is secured to a mechanical handle. This handle is secured to the water valve assembly by thumb screws. The function of the mechanical drive 524 is to move the water valve to open and closed positions.

Water valve assembly 389 comprises two handles. One is a mechanical handle. This handle is for the mechanical movement of the water valve. The mechanical handle is detachable which permits manual operation of assembly 389. The manual handle, when detached from the mechanical handle, permits manual operation of the system. The mechanical handle is secured by two thumb screws. Guide pins are provided which insure proper alignment of the mechanical handle. A mechanical handle coupler is connected to a coupling disk. The water valve assembly has two switches. These switches are wired to the electronic control board and tell the board when the water valve is open or closed. These switches also tell the board to override the DC motor rotation when the water valve open limit and closed limit positions have been reached. The function of the water valve assembly is to control input water flow into the hot water tank.

Pivot assembly 388 has a stop switch and is wired to the electronic control board. When this switch is activated, all DC motor rotation is terminated. Pivot assembly 388 also has a pivot shaft hole and provides an anchoring of the invention to the water pipe.

Buzzer 34 is designed to provide audible notification of an alarm condition. It is preferably a piezo buzzer having a audio output of at least 95 decibels.

Sensor 127 comprises three components. The first is made of nonconductive material when it is wet or dry. The second is made of nonconductive material that becomes conductive when wet. The third is made of conductive material having a resistance of 0 to 2 MEG-OHMS. When water leaks from inside of the hot water tank wetting the second sensor component an electrical circuit is completed. The alarm is activated by this condition. The sensor 127 notifies sensor/alarm status board 182 that water is leaking from inside of the hot water tank.

FIGS. 2a–2d are schematics that detail the electronic circuitry of the leak detection and shut-off apparatus in accordance with the invention. The sensor/alarm status board 182 comprises elements 1 through 45. The power source regulator circuit consists of resistor 1, zener diode 2 and capacitor 4. Resistor 1, preferably 100 ohms, ¼ watt, limits the current flow to zener diode 2, part no. 1N4739, thus protecting it from exceeding the maximum current flow limit of the component. Zener diode 2 regulates the voltage supplied to all of the circuits of the sensor/alarm status board 182 except resistor 3, 220 ohms, ¼ watt and relay 7, 12 volts, SPDT. The function of capacitor 4, 220 microfarad, electrolytic type, is to suppress voltage ripple and other spurious AC voltages caused by DC motor 126, 12 volts, 1.3 amps, 15,200 rpm and by the loading of the wall transformer 128, 12 volts DC, 3.0 amps.

Figure 2A:
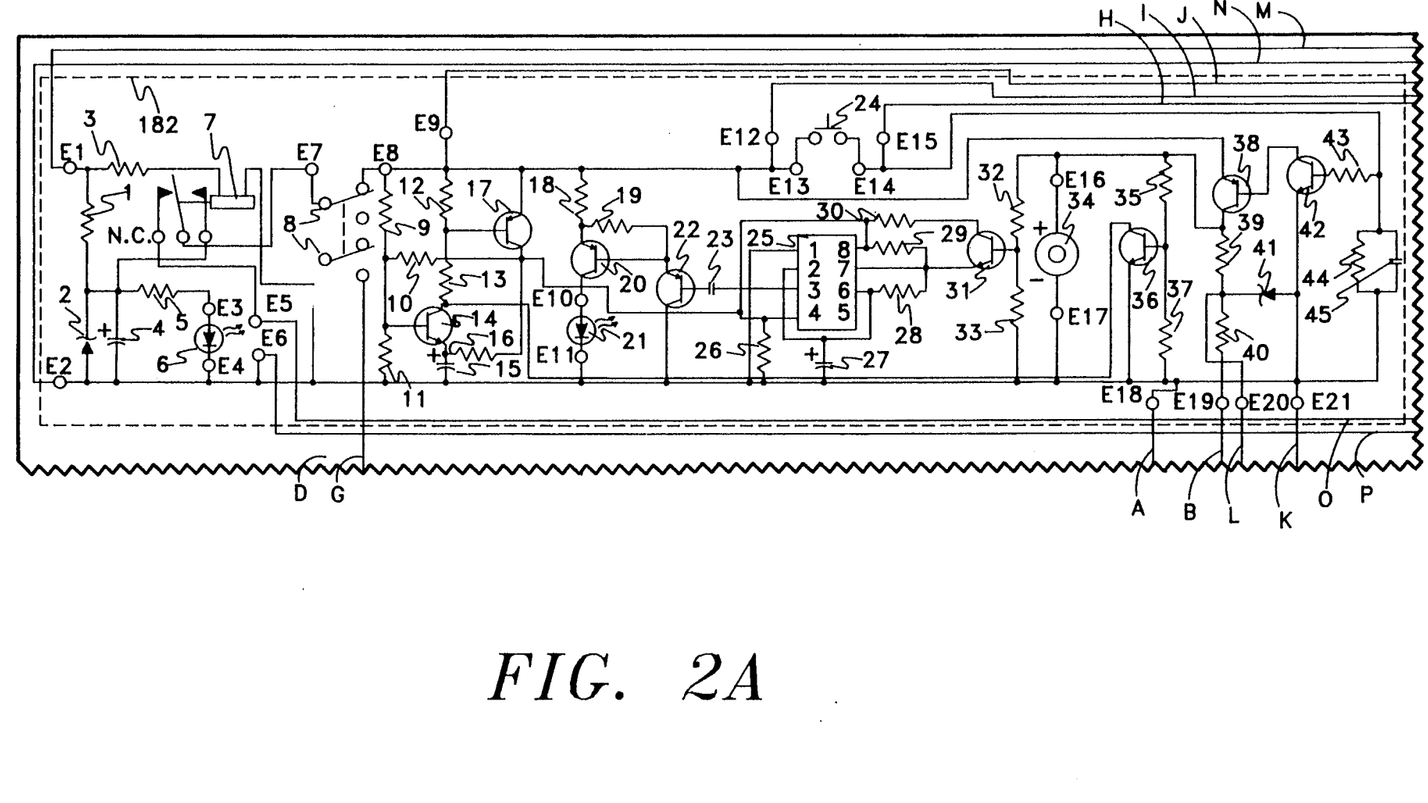
FIGS. 2a–2d are schematics that detail the electronic circuitry of the leak detection and shut-off apparatus in accordance with the invention.

The power source switching circuit consist of resistor 3 and relay 7. Resistor 3 limits the current flow and DC voltage to relay 7. Relay 7 directs current and voltage from two sources and connects the sources to status board 182 during wall transformer adapter or battery operation of the alarm.

The power source visual indicator circuit consists of resistor 5, 1 kohms, ¼ watt and LED 6, green. Resistor 5 limits the current flow to LED 6. LED 6 is located on the control panel and illuminates indicating that wall transformer 128 is supplying voltage and current. If wall transformer 128 is not supplying voltage and current LED 6 will not be illuminated. This condition will indicate that the battery power source 514 is supplying the power for the invention to operate.

The power source on/off circuit is accomplished by switch 8, DPDT. Switch 8 is located on the control panel 390. As shown in FIG. 2a, the low current drain multivibrator circuit comprises elements 9 through 17. Resistor 9, 10 Megohms, ¼ watt, resistor 10, 10 Megohms, ¼ watt and resistor 11, 10 Megohms, ¼ watt, are biasing resistors for transistor 14, part no. 2N3904. Resistor 12, 470 Kohms, ¼ watt and resistor 13, 47 Kohms provide DC biasing for transistor 17, part no. 2N3906. Capacitor 15, 47 microfarad, electrolytic, is a timing capacitor. When the voltage present at the emitter of transistor 14, is 0.7 volts or more lower than the voltage present at the base of transistor 14, current flows to capacitor 15, charging it. During this 2.5 second charging period, current flows through transistor 17 which supplies voltage and current to resistor 10, 10 Megohms, ¼ watt, resistor 16, 220 Kohms, ¼ watt and elements 25 through 30. When Capacitor 15 is charged to 0.7 volts or higher than the voltage present at the base of transistor 14, current stops flowing through transistor 14 to capacitor 15. Transistor 17 stops providing voltage and current to resistors 10 and 16 and elements 25 through 30 at this time. Capacitor 15 starts to discharge at this time through resistor 16 and IC 25, TLC555 to voltage supply (−). This discharge time of capacitor 15 takes 10 seconds. Resistors 16 and 13 determine the charging time for capacitor 15 and resistor 16 determines the discharge time for capacitor 15. Resistors 9, 10 and 11 determine the current draw of the low current draw multivibrator circuit when no voltage or current is supplied to elements 25 through 30 and have been selected to draw less than 1 microamp to conserve battery voltage during battery powered operation of the alarm. The function of the low current drain multivibrator circuit is to supply voltage and current to elements 25 through 30 for 2.5 seconds at an interval of 10 seconds.

As shown in FIG. 2a, the alarm status visual indicator circuit comprises elements 18 through 23 and 25 through 33. Integrated circuit timer IC 25, part no. TLC555, is externally configured to oscillate at two frequencies. Resistor 28, 2.2 Kohms, ¼ watt, resistor 29, 47 Kohms, ¼ watt and resister 30, 1 Kohm, ¼ watt are timing resistor for IC 25. Capacitor 27, 47 microfarad, electrolytic, is a timing capacitor for IC 25. Resistors 28, 29, 30 and capacitor 27 determine the frequency and duty cycle produced by lead #3 of IC 25. Resistors 28, 29 and capacitor 27 determine frequency A and its duty cycle during alarm set operation. Frequency $\underline{A}$ ON time is set to 1.84 seconds with an OFF time of $\overline{80}$ milliseconds. The ON time voltage is 90% of the voltage amplitude supplied to IC 25 and the OFF time voltage amplitude is 0 volts. With frequency $\underline{A}$ set in this configuration the initial charge time of capacitor 27 is 2.9 seconds. Since the low current drain multivibrator circuit only provides voltage and current to IC 25 for only 2.5 seconds, the output voltage of IC 25 lead #3 does no oscillate and follows the output voltage pattern of the low current drain multivibrator circuit, which has an output voltage ON time of 2.5 seconds and an output voltage OFF time of 10 seconds.

When the alarm triggered condition exists, transistor 31, part no. 2N3904, provides a current path that makes resistor 29 and 30 a parallel resistor pair. This condition changes the frequency and duty cycle present at IC 25, lead #3. Frequency B is set by this condition. Frequency B ON time is 100 milliseconds with an OFF time of 100 milliseconds. Capacitor 23, 0.047 microfarad, ceramic disc, is charged and discharged by IC 25, lead #3. When capacitor 23 is discharged the base of transistor 22, part no. 2N3906, is provided with an AC type voltage and current biasing characteristic. This condition allows current to flow from the emitter of transistor 22 to the collector of transistor 22 which is connected to voltage supply (−). The base of transistor 20, part no. 2N3906, is connected to the emitter of transistor 22 and is provided with a current path to voltage supply (−) through transistor 22. Current flows from the emitter of transistor 20 to the collector of transistor 20 under this condition. The current from the collector of transistor 20 flows through LED 21, clear red light, which is located on control panel assembly 390. LED 21 illuminates under this condition.

The brightness and duration of illumination is determined by the capacitance of capacitor 23, 0.047 microfarad, ceramic disc type. During battery operation of the alarm, if the output voltage present at lead #3 of IC 25, part no. TLC555, is too low LED 21, clear red light, will not illuminate. This condition will indicate that the batteries are not providing sufficient voltage and should be replaced with new batteries. Resistor 18, 10 ohms, ¼ watt, limits the amount of current that flows through Transistor 20, part no. 2N3906. Resistor 19, 22 kohms, ¼ watt, supplies the current for the voltage supply (−) path current flow to transistor 20 to permit current to flow to LED 21. Resistors 32, 1 kohms, ¼ watt and 33, 220 kohms, ¼ watt, provide DC biasing for transistor 31, part no. 2N3904, in the alarm triggered condition and transistor 31 provides a current path from resistor 30, 1 kohms, ¼ watt, to resistor 29, 47 kohms, ¼ watt, which makes a parallel resistor pair. This condition changes the output frequency of lead #3 of IC 25. Resistor 26, 47 Kohms, ¼ watt, provides a voltage drop to voltage supply (−) which maintains a constant voltage at lead #4.

The sensor circuit comprises elements 130, 127 and 42 through 45. The function of resistor 44, 1 megohms, ¼ watt, and capacitor 45, 0.047 microfarad, ceramic disc type, is to suppress voltage ripple and other spurious AC voltages caused by DC motor 126, 12 volts, 1.3 amps, 15,200 rpm, or an external source that could cause false biasing of transistor 42, part no. 2N3904. Resistor 43, 1 megohms, ¼ watt, sets the DC biasing current and sensitivity of transistor 42. Water sensor 127 as described above has three component parts. When water leaks from inside of the hot water tank wetting the second sensor component a maximum current flow of 18 microamps flows from E12 to sensor 127 and through the conductive path created by the leaking water and back to E15. E15 is connected to resistors 43, 44 and capacitor 45. The base of transistor 42 is DC biased by the current flow from E15. This condition permits current to flow from the emitter of transistor 38, part no. 2N3906, to the collector of transistor 42 and out front of the emitter of transistor 38 to the collector of transistor 38. This condition permits voltage and current to flow from the collector of transistor 38 to the low current drain multivibrator override circuit, alarm status visual indicator circuit, alarm status audio indicator circuit and the external trigger circuit.

Figure 4:
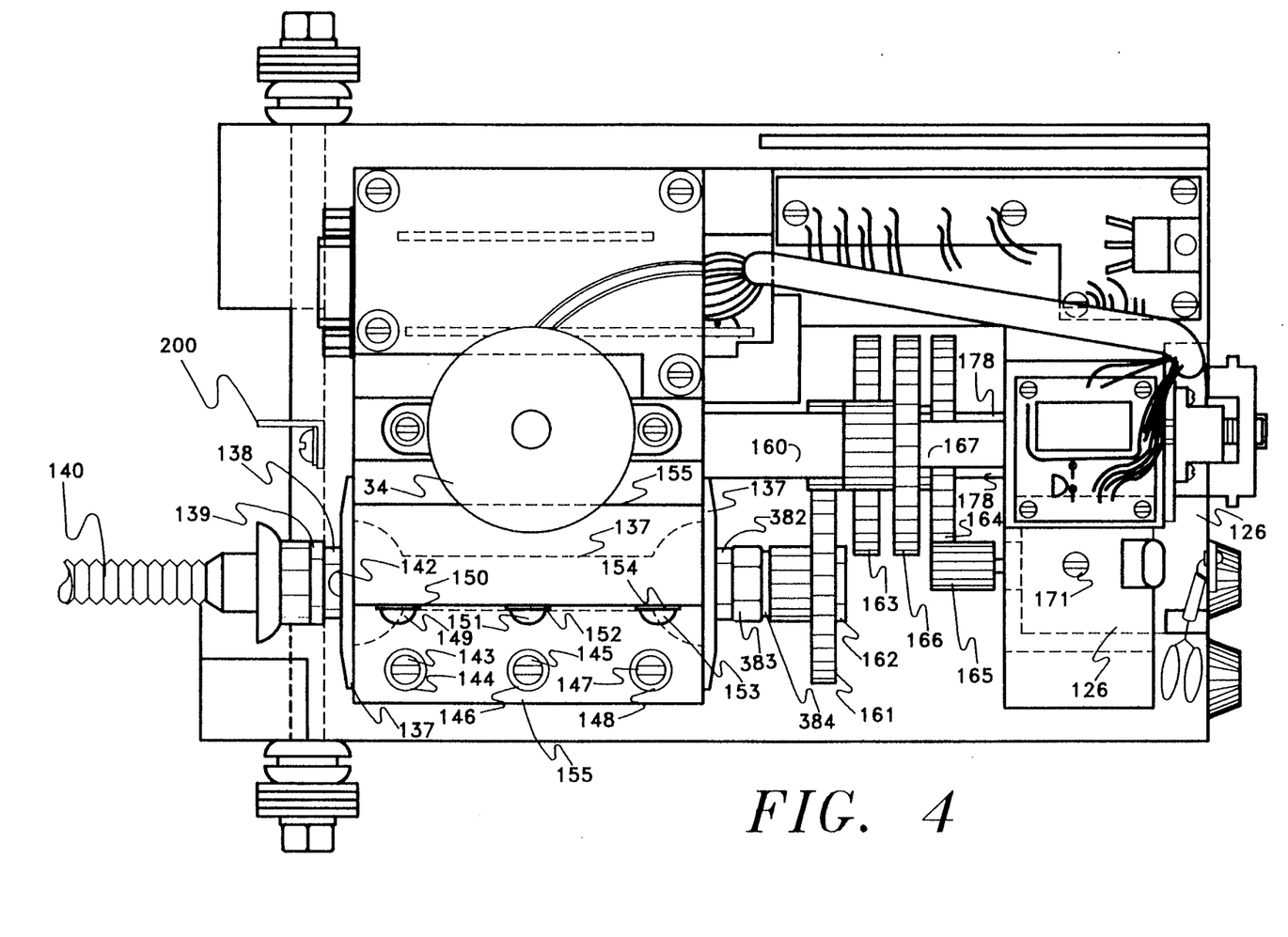
FIG. 4 is a detailed view of the mechanical drive assembly of the invention.

The alarm status audio indicator circuit is piezo buzzer 34, pulsating, 2800 hz, 95 db. The buzzer 34 is activated by the flow of current from the collector of transistor 38 and produces a pulsating audio output at 95 decibels. Buzzer 34 is mounted on control box base 136 as shown in FIG. 4.

The low current drain multivibrator override circuit consists of two resistors 35, 47 kohms, ¼ watt, 37, the same value as 35 and transistor 36, 2N3904. Resistors 35 and 37 are DC biasing resistors for transistor 37. When current flows from the collector of transistor 38, the base of transistor 36 is DC biased and current flows from the collector of transistor 14, 2N3904, to the collector of transistor 36 to voltage supply (−) through the emitter of transistor 36. The base of transistor 17, 2N3906, is provided with DC biasing through this path. The low current drain multivibrator will provide constant voltage and current to elements 18 through 30 as long as this condition is present.

The external trigger output circuit consist of two resistors 39, 2.2 kohms, ¼ watt, 40, 1 kohms, ¼ watt and zener diode 41, part no. 1N4733. Resistor 39 is a current limiting resistor for zener diode 41. Resistor 40 is a current limiting resistor for transistor 93, 2N3904. When current flows from the collector of transistor 38, this circuit supplies trigger voltage and current to the electronic control board 183 and the alarm accessory trigger board 170, triggering them into operation.

The alarm test circuit utilizes switch 24, SPST, which is located on the control panel 390. When switch 24 is placed in the closed position and released, a water leak condition is simulated. This condition activates the alarm. The alarm will move the water valve from the open position to the closed position.

Figure 2B:
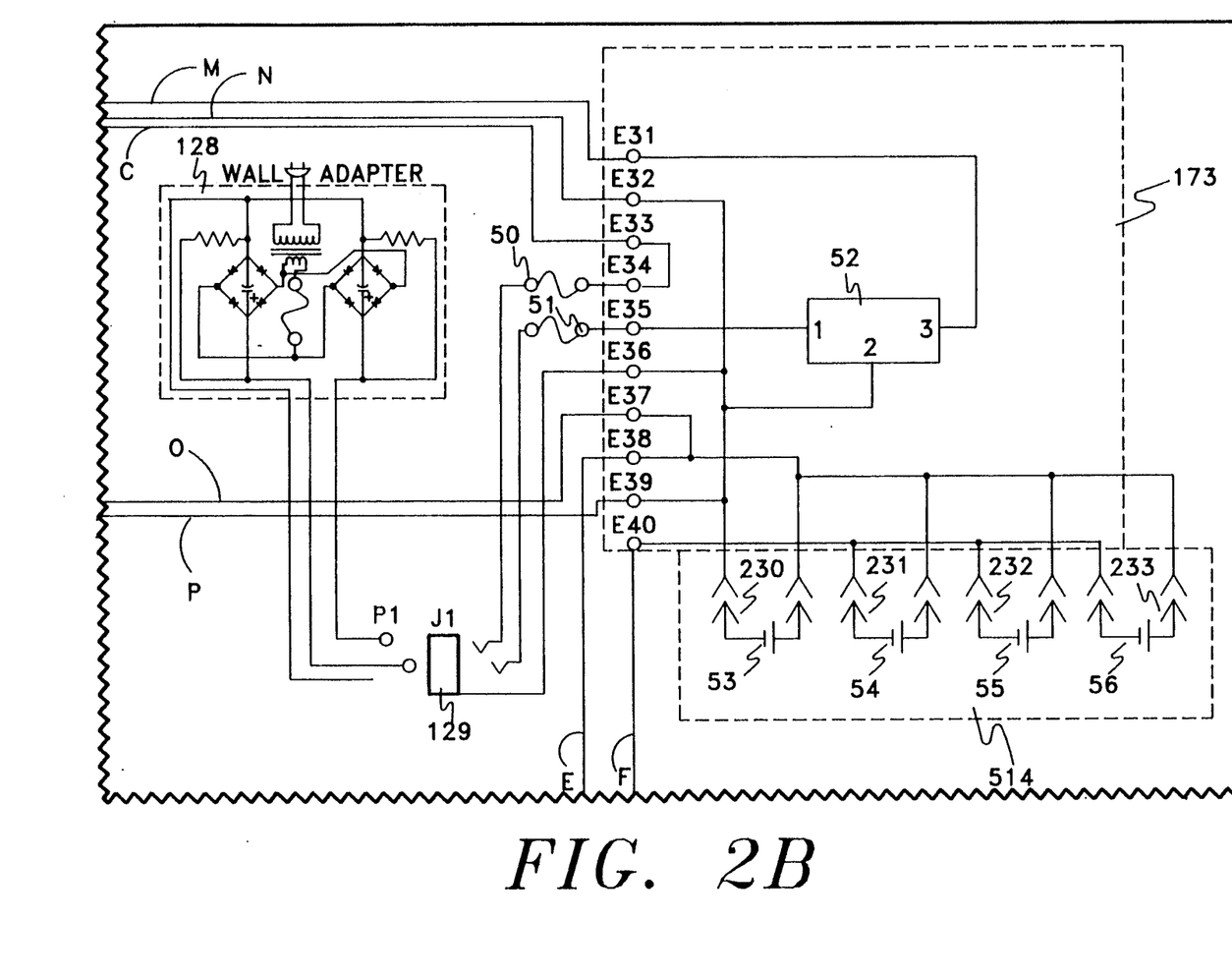
Figure 2C:
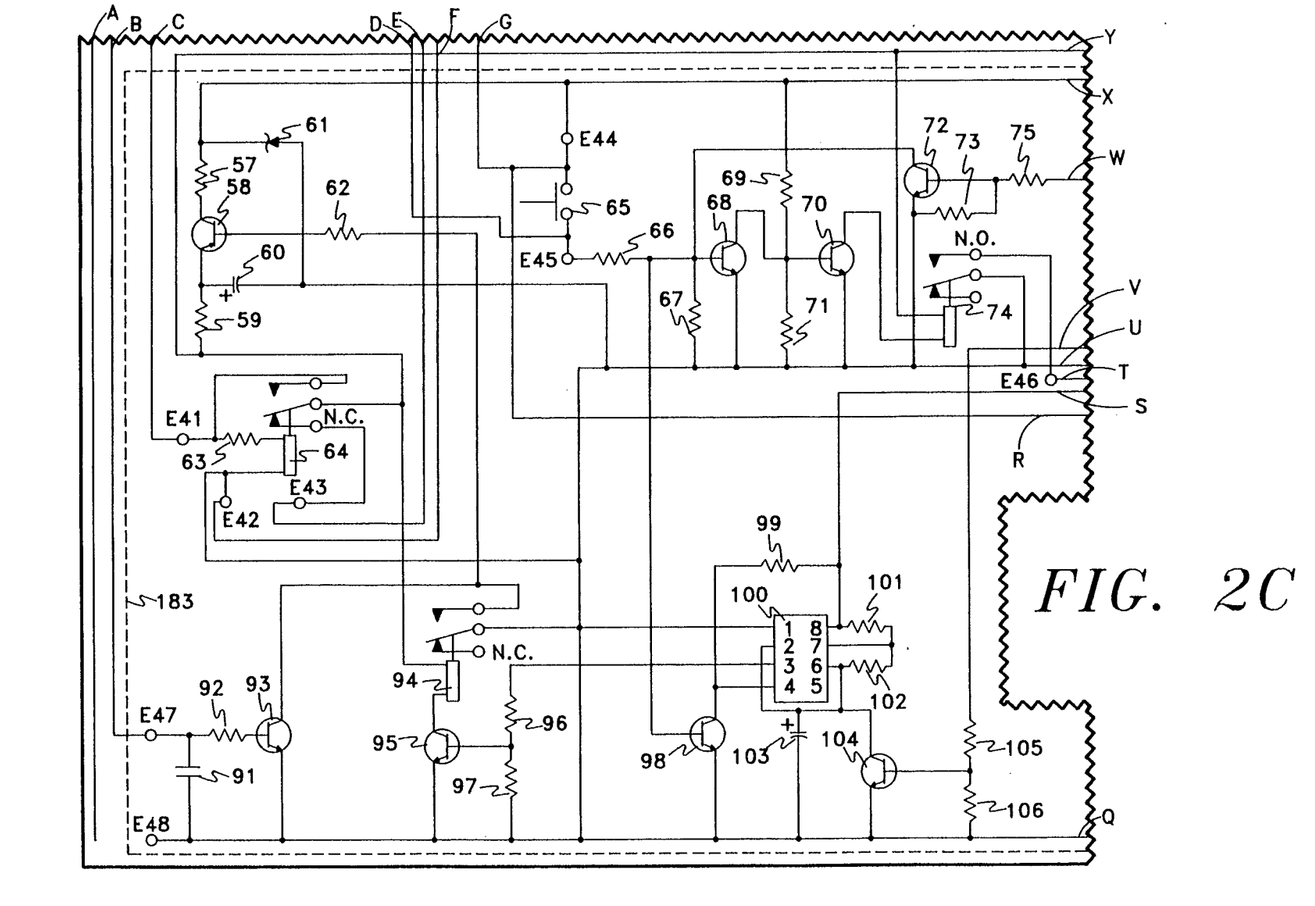
Figure 2D:
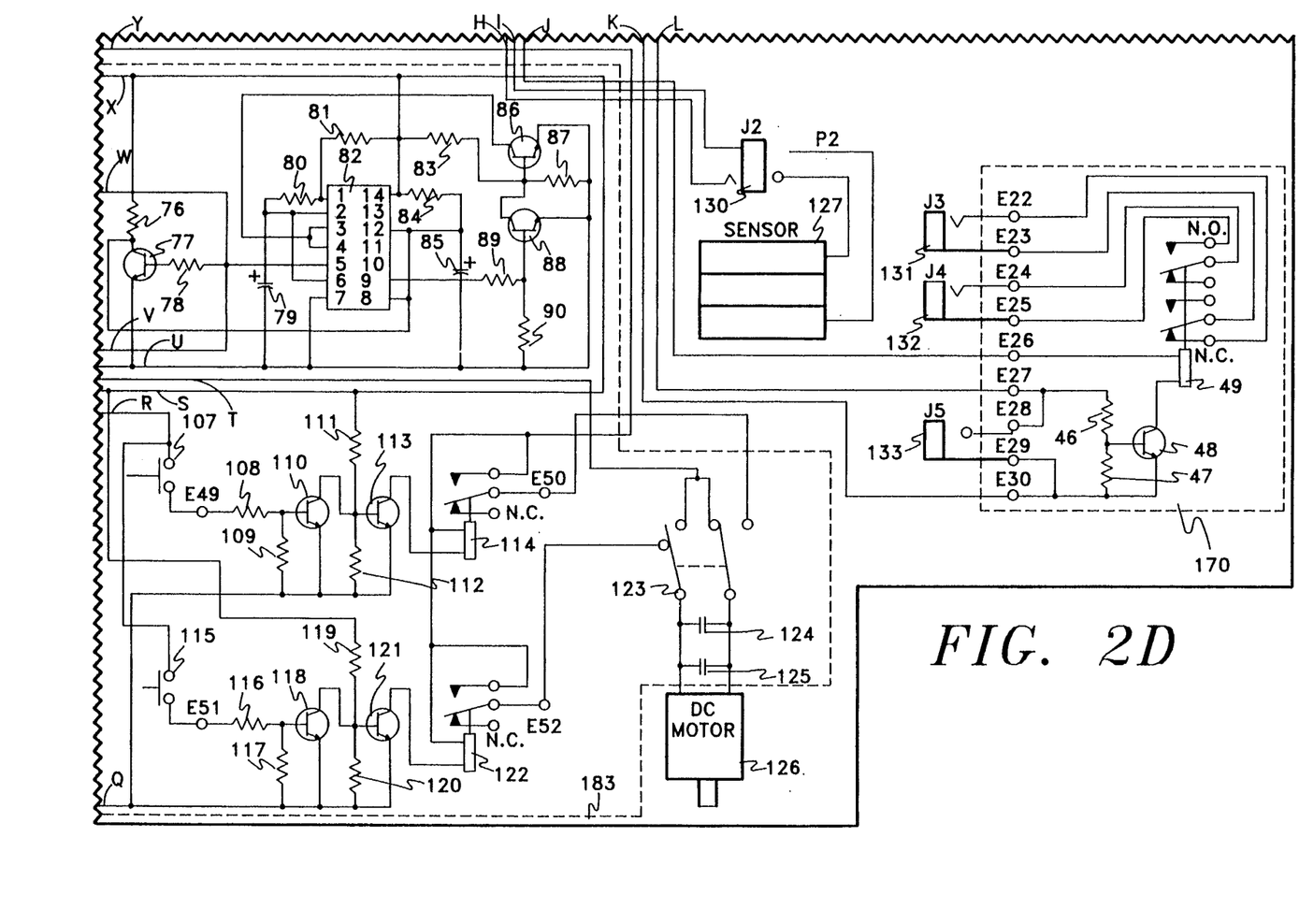

The electronic control board 183 comprises elements 57 through 125. The power source switching circuit consists of resistor 63, 100 ohms, ¼ watt and relay 64, 12 volts, SPDT. Resistor 63 is a current limiting resistor that also provides a voltage drop from the output of wall transformer 128 to the required supply voltage needed to operate relay 64. Relay 64 directs voltage and current from two sources and connects the selected source to elements 57 through 62 and 65 through 126.

The input trigger circuit consist of capacitor 91, 0.047 microfarad, ceramic disk, resistor 92, 470 kohms and transistor 93, 2N3904. Capacitor 91 is a ceramic disc capacitor. Its function is to suppress voltage ripple and other spurious AC voltages caused by DC motor 126 or an external source that could cause false biasing of transistor 93. Resistor 92 is a biasing resistor for transistor 93, that controls the base current of transistor 93, when E47 receives voltage and current from resistor 40 of the sensor/alarm status board 182. This condition provides a current path for the base of transistor 58, 2N3906, through resistor 62, 10 kohms, which is connected to the collector of transistor 93 and to voltage supply (−) through the emitter of transistor 93.

The power source regulator circuit consist of elements 57 through 62. Resistors 57 and 59, both 100 ohms, are current limiting and isolation resistors that limit current flow through transistor 58 and zener diode 61, 1N4733. Resistor 62 is a current limiting resistor for transistor 58. When transistor 93 provides a current path to voltage supply (−) for the base of transistor 58, current flows from the emitter of transistor 58 to the collector of transistor 58, providing resistor 57 and zener diode 61 with voltage and current. Zener diode 61 limits the output voltage of the regulator circuit to five volts. The function of capacitor 60, 220 microfarad, is to suppress voltage ripple and other spurious AC voltages caused by the DC motor 126 and by the loading of wall transformer 128. The power source regulator output voltage is zero volts during alarm standby operation and five volts during alarm triggered operation.

The DC motor power source return switching circuit consist of elements 69 through 71 and 74. Resistors 69, 10 kohms, and 71, 47 kohms, are biasing resistors for transistor 70, 2N3904. When the power source regulator output voltage is applied, transistor 70 provides a current path for relay 74 to voltage supply (−), This event will change relay 74, 12 volts, SPDT, from a normally closed contact position to a normally open contact position. A current path is provided to voltage supply (−) for DC motor 126 through switch 123, DPDT, and relay 74 common lead which is connected to voltage supply (−).

The DC motor power source open condition switching circuit consists of elements 111 through 114. Resistors 111, 10 kohms, and 112, 470 kohms, are biasing resistors for relay 114, SPDT. When the power source regulator output voltage is applied, transistor 113, 2N3904, provides a current path for relay 114 to voltage supply (−). This event will change relay 114 from a normally closed contact position to a normally open contact position. A current path is provided to voltage supply (+) for DC motor 126 through switch 123 and relay 114 normally open lead which is connected to voltage supply (+), The DC motor power source closed condition switching circuit consists of elements 119 through 122. Resistors 119, 10 kohms, and 120, 470 kohms, are biasing resistors for transistor 121, 2N3904. When the power source regulator voltage is applied, transistor 121 provides a current path for relay 122, SPDT to voltage supply (−). This event will change relay 122 from a normally closed contact position to a normally open contact position. A current path is provided to voltage supply (+) for DC motor 126 through switch 123 and relay 122 normally open lead which is connected to voltage supply (+).

The close limit circuit consist of elements 115 through 118. Resistors 116, 220 kohms, and 117, 470 kohms, are biasing resistors for transistor 118, 2N3904. When switch 115, SPDT is pressed by the manual handle 334 (described in FIGS. 3 and 6), voltage and current are applied to resistors 116 and 117. Transistor 118 provides a current path to voltage supply (−) for the base of transistor 121. This in turn stops the current flow from relay 122 to voltage supply (−) through transistor 121. This event will change relay 122 from a normally open contact position to a normally closed contact position. The current path from voltage supply (+) to switch 123 and DC motor 126 is also disconnected by this event depriving DC motor 126 of a positive voltage source.

The open limit circuit consists of elements 107 through 110. Resistors 108, 220 kohms, and 109, 470 kohms, are biasing resistors for transistor 110, 2N3904. When switch 107, preferably a monetary, SPDT, lever type, is pressed by manual handle 334 voltage and current are applied to resistors 108 and 109. Transistor 110 provides a current path to voltage supply (−) for the base of transistor 113. This event will change relay 114 from a normally open contact position to a normally closed contact position. The current path to voltage supply (+) to switch 123 and DC motor 126 is also disconnected by this event depriving DC motor 126 of a positive voltage source.

The stop circuit consists of elements 65 through 68. Resistors 66, 22 kohms, and 67, 220 kohms, are biasing resistors for transistor 68, 2N3904. When switch 65, SPDT, is pressed by contact probe 200, voltage and current are applied to resistors 66 and 67. Transistor 68 provides a current path to voltage supply (−) for the base of transistor 70. This in turn stops the current flow from relay 74 to voltage supply (−) through transistor 68. This event will change relay 74 from a normally open contact position to a normally closed contact position. The current path from voltage supply (−) to switch 123 and DC motor 126 is also disconnected by this event depriving DC motor 126 of a return path to voltage supply (−).

The stop override circuit consists of elements 72, 73 and 75 through 90. Resistors 73, 470 kohms, and 75, 220 kohms, are biasing resistors for transistor 72, 2N3904. Resistors 89, 220 kohms, and 90, 470 kohms, are biasing resistors for transistor 88, 2N3904. Resistors 83, 47 kohms, and 87, 220 kohms, are biasing resistors for transistor 86, 2N3904. Resistor 78, 220 kohms, is a biasing resistor for transistor 77, 2N3904, and resistor 76, 220 kohms, is a current limiting resistor for the collector to emitter current flow of transistor 77 and is also a timing resistor for timer #2 of IC 82, TLC556. Resistors 80, 47 kohms, 81, 10 kohms, and 84, 2.2 kohms are timing resistors for IC 82. Capacitors 79, 47 microfarad, and 85, also 47 microfarad, are timing capacitors for IC 82. IC 82 is an integrated dual timer circuit, preferably part no. TLC556. Lead #5 is the output lead for timer #1 and lead #9 is the output lead for timer #2. When voltage and current are supplied by the power source regulator circuit lead #5 and lead #9 change from zero volts to greater than 4.5 volts. The time of this event is time zero (TO). The voltage at lead #5 permits transistor 77 to provide lead #8 and #12 of IC 82 a current path to voltage supply (−) for (TO+3.5) seconds. At (TO) lead #5 of capacitor 85 also applies voltage and current to resistors 73 and 75. Transistor 72 provides a current path to voltage supply (−) for the base of transistor 68 for a period of (TO+3.5) seconds. This allows transistor 70 to provide a current path to voltage supply (−) for relay 74. Relay 74 provides a current path to voltage supply (−) for DC motor 126. DC motor 126 has (T+3.5) seconds to move contact probe 200 from being in contact with switch 65. At (TO) lead #9 of IC 82 applies voltage to resistors 89 and 90. Transistor 88 provides the base of transistor 86 with a current path to voltage supply (−). This keeps lead #3 and #4 of IC 82 at greater than 2.5 volts. At (TO+3.5) seconds lead #5 of IC 82 drops to zero volts and transistor 77 no longer provides a current path for lead #8 and #12 of IC 82 to voltage supply (−). Capacitor 85 starts to charge up at this time. At (TO+3.6) seconds the charge voltage of Capacitor 85 triggers timer #2 output lead #9 to drop to zero volts and transistor 88 no longer provides the base of transistor 86 with a current path to voltage supply (−). Transistor 86 provides lead #3 and #4 of IC 82 with a current path to voltage supply (−). This event puts timer #1 into the reset condition. Lead #5 of IC 82 stays at zero volts until the alarm is reset. Resistors 76 and 84 continue to provide capacitor 85 with voltage and current. This condition keeps the voltage at lead #9 of IC 82 at zero volts until the alarm is reset.

The latch on alarm trigger circuit consists of elements 94 through 97 and 100 through 103. Resistors 96 and 97, 22 kohms and 220 kohms respectively, are biasing resistors for transistor 95, 2N3904. IC 100 is an integrated timer circuit, preferably part no. TLC555. Resistors 101 and 102, 220 kohms and 470 kohms respectively, are timing resistors. Capacitor 103, 220 microfarad, is a timer capacitor. When voltage and current is applied to the latch on alarm trigger circuit by the power source regulator circuit, the voltage at lead #3 of IC 100 increases from zero volts to greater than 4.5 volts. This voltage is applied to resistors 96 and 97. Transistor 95 provides a current path to voltage supply (−) for relay 94. This event will change relay 94, SPDT from a normally closed contact position to a normally open contact position. The base of transistor 58 is provided with a current path to voltage supply (−) through resistor 62 and relay 94 by this event. Lead #3 of IC 100 stays at greater than 4.5 volts for three minutes and thirty seconds which in turn permits the power source regulator circuit to maintain voltage and current output for the same length of time during alarm triggered operation or test operation mode.

The latch on alarm trigger override circuit consists of elements 98, 99 and 65 through 67. Resistors 66 and 67 are biasing resistors for transistor 98, 2N3904. Resistor 99, 10 kohms, is a current limiting resistor for transistor 98. When contact probe 200 presses switch 65, voltage and current are applied to resistors 66 and 67 from the power source regulator circuit. This condition provides lead #4 of IC 100 with a current path to voltage supply (−). Lead #4 is the reset lead for IC 100. The reset condition permits the voltage at lead #3 of IC 100 to drop from greater than 4.5 volts to zero volts. The latch on alarm trigger circuit has been overridden by this condition.

The latch on alarm trigger charge delay circuit consists of elements 104 through 106. Resistors 105 and 106, 22 kohms and 220 kohms respectively, are biasing resistors for transistor 104, 2N3904. When voltage and current are supplied to resistors 105 and 106 from the stop override circuit, transistor 104 provides a current path to voltage supply (−) for IC 100, resistor 102 and capacitor 103 for 3.6 seconds. After 3.6 seconds has passed the stop override circuit no longer supplies resistors 105 and 106 with voltage and current. This stops transistor 104 from providing a current path to voltage supply (−) for Ic 100, resistor 102 and capacitor 103. Capacitor 103 starts to charge at this time and the latch on trigger circuit continues with its normal operating process.

The DC motor rotation control circuit consists of switch 123. Switch 123 is a switch that changes the voltage polarity applied to the DC motor terminals. This switch is located on the control panel 390. The DC motor 126 rotation will be clockwise in one switch position and counter clockwise in the opposite switch position.

The DC motor noise suppression circuit consists of capacitors 124 and 125, both 0.1 microfarad, which are both ceramic disc capacitors. The function of capacitors 124 and 125 is to suppress spurious AC voltages that are emitted from the armature contacts of DC motor 126.

The power distribution board comprises elements 52 through 56 and 230 through 233. The voltage regulator circuit consists of voltage regulator 52, which is a 12 volt voltage regulator, preferably part no. LM340T12 (7812). Wall transformer 128 supplies voltage regulator 52 with 18.5 to 20.0 volts during alarm standby operation through jack connector 129 and fuse 51, ½ amp, fast blow. Jack connector 129 is a three conductor jack. This circuit supplies voltage and current to the sensor/alarm status board 182 and to the alarm accessory trigger board 170.

The supply voltage circuit consists of an electrical connection between terminals E33 and E34. Wall transformer 128 supplies fuse 50, 4 amp, fast blow, with voltage and current. The voltage and current that flows through fuse 50 are applied to the electronic control board 183 through E33 and E34.

The battery power source 514 consists of elements 53 through 56 and 230 through 233. Batteries 53 through 56 are 9 volt batteries. Connectors 230 through 233 are snap connectors. Voltage and current are supplied to all of the alarm circuits through connectors 230 through 233 and terminals E36 through E40. This circuit supplies voltage and current only when wall transformer 128 fails to supply voltage and current or when battery powered operation is selected.

The alarm accessory trigger board 506 comprises components 46 through 49. The alarm accessory trigger circuit consists of components 46 through 49. Resistors 46 and 47, 22 kohms and 47 kohms respectively, are biasing resistors for transistor 48, 2N3904. Relay 49, DPDT is a 12 volt DC relay. When the alarm is triggered into the alarm condition, current and voltage are applied to resistor 46 and relay 49 from the external trigger circuit located on the sensor/alarm status board 182. This event will make transistor 48 provide relay 49 with a current path to voltage supply (−). The normally closed and normally open contacts of relay 49 will change contact position at this time. Any external alarm monitoring device which is connected to relay 49 through connectors 131 and 132 will be triggered into operation by this change of relay contact position. The external trigger circuit also supplies 5 volts DC to connector 133 through terminals E28 and E29. This voltage can also be used to trigger an external alarm monitoring device.

Figure 3:
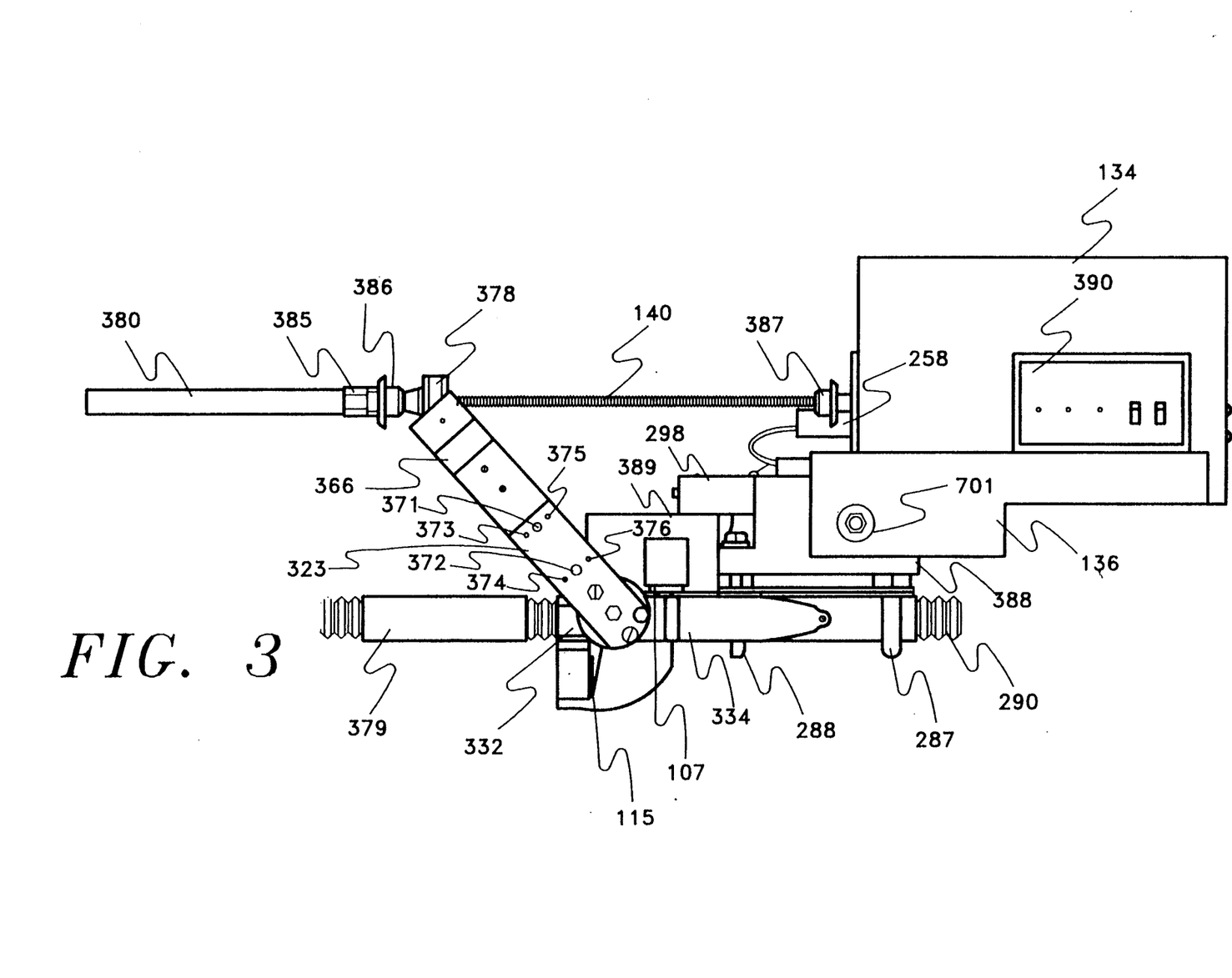
FIG. 3 is side view of the invention shown mounted on a cold water pipe.

As shown in FIG. 3, control box cover 134 covers control panel assembly 390 and control box base 136. The function of control box cover 134 is to protect the elements of the invention that it covers from dirt, dust or moisture that could cause a malfunction of the alarm. Control panel 390 controls all electrical and mechanical alarm functions and displays conditions for alarm status OFF, SET or TRIGGERED. Drive shaft 140, preferably a threaded rod, 5/16, 24 threads per inch, rotates when the alarm is triggered. This rotation moves drive shaft rider 378 along the length of drive shaft 140. This in turn moves mechanical handle 366 which is connected to mechanical handle coupler 323. Mechanical handle coupler 323 is an element of water valve assembly 389. Water valve 332, preferably a ¼ turn, ball type, is turned from the fully open position to the fully closed position, shutting off the flow of water from pipe 379 to pipe 290. Control box base 136 pivots on pivot shaft assembly 701 during the movement of drive shaft rider 378.

The movement of drive shaft rider 378 is limited by nuts 386 and 387. If an electrical failure occurs, and drive shaft rider 378 moves past its normal open and closed positions on drive shaft 140, drive shaft rider 378 binds up with nut 386 or 387. This binding force will cause fuse 50, preferably 4A, FB, as shown in FIG. 2b to blow.

Referring to FIG. 3, this fuse blowing event will stop the rotation of drive shaft 140. Mechanical handle 366 is secured to mechanical handle coupler 323 by thumb screws 371 and 372. The alignment of mechanical handle 366 and mechanical handle coupler 323 are maintained by guide pins 373, 374, 375 and 376.

Manual override of the alarm is performed by grasping drive shaft handle 380 with one hand and removing thumb screws 371 and 372 with the other hand. This releases mechanical handle 366 from mechanical handle coupler 323. Drive shaft handle 380 can now be raised and released when control box base 136 reaches a position just above pipe 290. Water valve 332 can now be opened or closed by moving manual handle 334 to the desired position. Pivot assembly 388 is secured to pipe 290 by U bolts 287 and 288, Pivot assembly 388 provides an anchored pivot point for control box base 136. The function of alignment assembly 298 is to maintain proper alignment of pivot assembly 388 with respect to water valve assembly 389. The alignment is important to maintain proper operation of the alarm.

Electrical cable connector 258 plugs into control box cover 134. Cable connector 258 electrically links water valve assembly 389 and pivot assembly 388 to control box base 136 which holds the electrical control and processing circuitry needed to operate the alarm.

As shown in FIG. 4, the mechanical drive system comprises a RPM to torque converter assembly comprising elements 126, 136, 160 through 167, 171, 178 and 220. DC motor 126, preferably 12 V, 1.3 A, 15,200 rpm, is mounted in a cavity formed to the shape of DC motor 126. This cavity is part of control box base 136. Screw 171, round head, 4/40, holds DC motor 126 securely in place. Gear 165 is connected to the armature shaft of DC motor 126 and gear 165 is the first gear of the RPM to torque converter assembly. Gear 165 rotates compound gear 164, which in turn rotates compound gear 166, which in turn rotates compound gear 163, which in turn rotates the final gear of the assembly, compound gear 161.

This compound gear configuration converts the high speed rotation of DC motor 126, which has a minimum of torque, to the slower speed of rotation possessed by compound gear 161, which possess a large amount of torque when compared to that of DC motor 126. Compound gears 163 and 164 rotate on a gear shaft and are held in position by control box base 136 and spacers 220 and 178. Compound gear 166 rotates on a gear shaft and is held in position by control box base 136 and spacers 160 and 167.

As shown in FIG. 4, the next part of the mechanical drive system comprises a drive shaft assembly having elements 162, 382 through 383 and 136 through 155 and 378, 380, 385 and 386. Compound gear 161, which is the last stage of the RPM to torque assembly, is mounted to drive shaft 140 and is held in position by nut 162, washer 384 and nut 383. Drive shaft 140 runs through ball bearing assembly 137, which provides a smooth low friction rotation characteristic for drive shaft 140. Drive shaft 140 is held in position relative to its length by nuts 382, 383, 138 and 139. Ball bearing assembly 137 is mounted on control box base 136 and is held in position by ball bearing assembly holder 155 and screws 142, 143, 145, 147, 149, 151 and 153 and washers 144, 146, 148, 150, 152 and 154.

Figure 6:
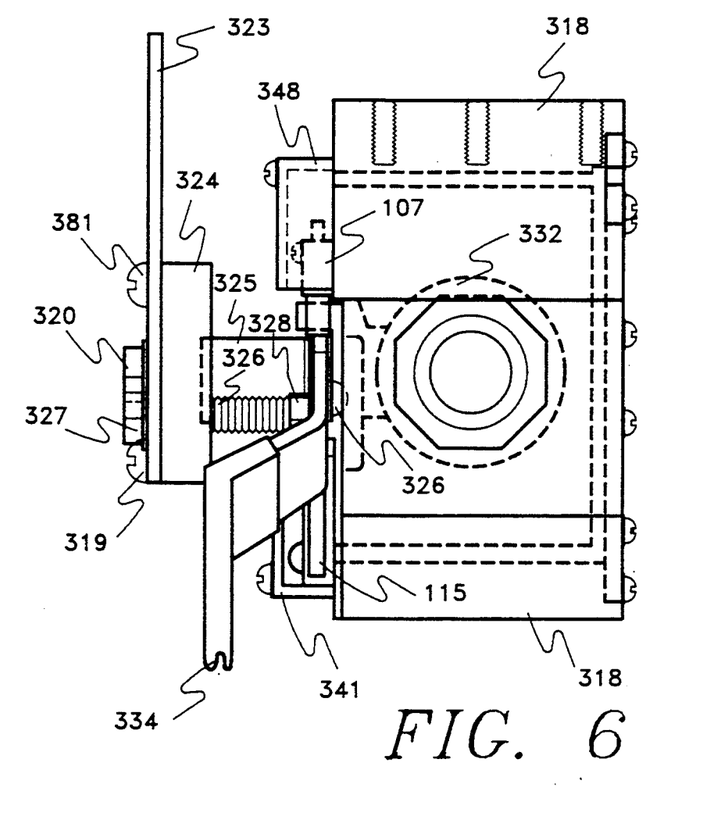
FIG. 6 is a detailed view of the water valve assembly.

As shown in FIG. 3, nut 387 is the mechanical movement limiting element for drive shaft rider 378. Drive shaft rider 378 has a threaded hole through it, which permits it to move along the length of drive shaft 140, which rotates. Nut 387 is provided as a safety feature to mechanically limit the movement of drive shaft rider 378, when water valve 332, as shown in FIG. 6, is fully closed if switch 115, preferably a momentary, SPDT, lever type, fails to electrically stop the movement of drive shaft rider 378. Nut 386 is provided as a safety feature to mechanically limit the movement of drive shaft rider 378, when water valve 332 is fully open and switch 107 fails to electrically stop the movement of drive shaft rider 378. If switch 115 or 107 fails to stop the movement of drive shaft rider 378 and drive shaft rider 378 is binding up with nut 386 or 387, all rotation of drive shaft 140 stops. As shown in FIG. 2d, this binding condition loads down DC motor 126 and causes DC motor 126 to draw more electrical current than fuse 50, 4A, FB, can handle. Fuse 50 will blow under this condition and all electrical current will be removed from DC motor 126. As shown in FIG. 3, drive shaft handle 380 is mounted to drive shaft 140 and is torqued against nut 385 to hold it in position on drive shaft 140. Drive shaft handle 380 is utilized when removing mechanical handle 366 from mechanical handle coupler 323 to turn water valve assembly 332 manually to open or closed positions.

Figure 5:
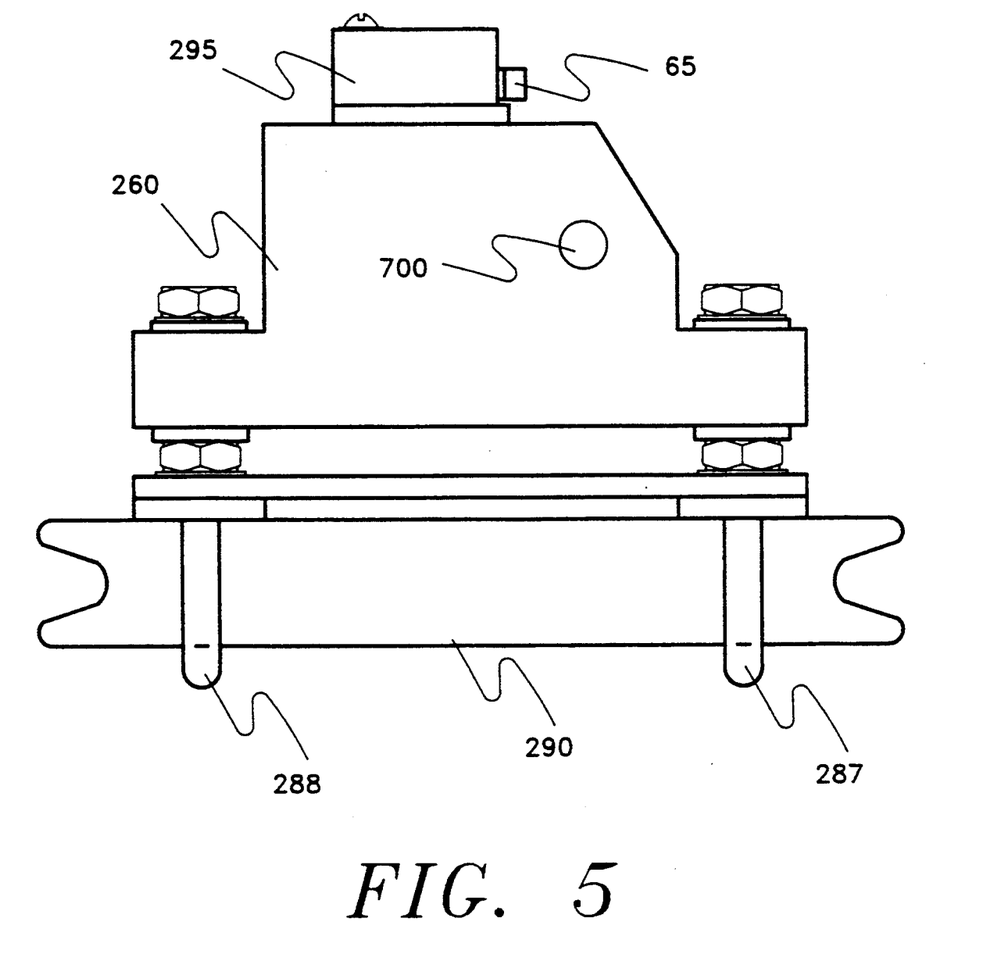
FIG. 5 is a detailed view of the pivot assembly.

As shown in FIG. 5, pivot assembly 388 comprises elements 65, 260, 287, 288, 290 and 295. Switch 65, preferably a momentary, SPDT, lever type, is the stop switch and, as shown in FIG. 2c, is wired to electronic control board 183. When contact probe 200, as shown in FIG. 4, presses switch 65, as shown in FIG. 2c, armature rotation of DC motor 126 stops upon this event. As shown in FIG. 5, switch 65 is covered by switch cover 295. Switch cover 295 protects switch 65 from dirt, dust or moisture that could cause a switch malfunction. Pivot assembly base 260 possesses pivot shaft hole 700. As shown in FIG. 3, pivot shaft assembly 701 utilized pivot shaft hole 700 to connect pivot assembly 388 to control box base 136. Control box base 136 pivots on pivot shaft assembly 701 when water valve 332 is turned to open or closed positions. As shown in FIG. 5, pivot assembly base 260 is secured to cold water pipe 290 by U bolts 287 and 288. The function of pivot assembly 388 is to provide anchoring for the alarm to cold water pipe 290. Pivot assembly 388 also provides an anchored pivot point for control box base 136 and provides control box base 136's pivot position to electronic control board 183 by means of lever switch 65.

As shown in FIG. 6, water valve assembly 389 comprises elements 107, 115, 318, 319, 323 through 327, 332, 334, 341, 348 and 381. Switch 107 is the open limit switch and is wired to electronic control board 183 as shown in FIG. 2d. When manual handle 334 of water valve 332 is turned to the fully open position, it presses switch 107. As shown in FIG. 2, DC motor 126 armature rotation stops. Switch 115 is the close limit switch and is wired to the electronic control board as shown in FIG. 2d. When manual handle 334 of water valve 332 is turned to the fully closed position, it presses switch 115.

Switch covers 348 and 341 protect switches 107 and 115 from dirt, dust and moisture that could cause a switch malfunction. Water valve assemble base 318 possesses a cavity that conforms to the shape of water valve 332. This keeps water valve base 318 in the same physical orientation relative to water valve 332. As shown in FIG. 3, the mechanical handle 366 is coupled to water valve assembly 389 by mechanical handle coupler 323. Referring back now to FIG. 6, mechanical coupler 323 is secured to mechanical handle coupling disk 324 by screws 319 and 381. Mechanical handle coupling disk 324 is secured to standoff nut 325 by bolt 320. Standoff nut 325 is secured to the threaded stud of water valve 332. Mechanical handle coupling disk 324 is secured to manual handle 334 by bolt 326, nut 328 and nut 327. Mechanical handle coupling disk 324 is secured in this manner to insure that the physical orientation between mechanical handle coupling disk 324 and manual handle 334 does not change when water valve assembly 389 is to control input water flow into the hot water tank.

Figure 7:
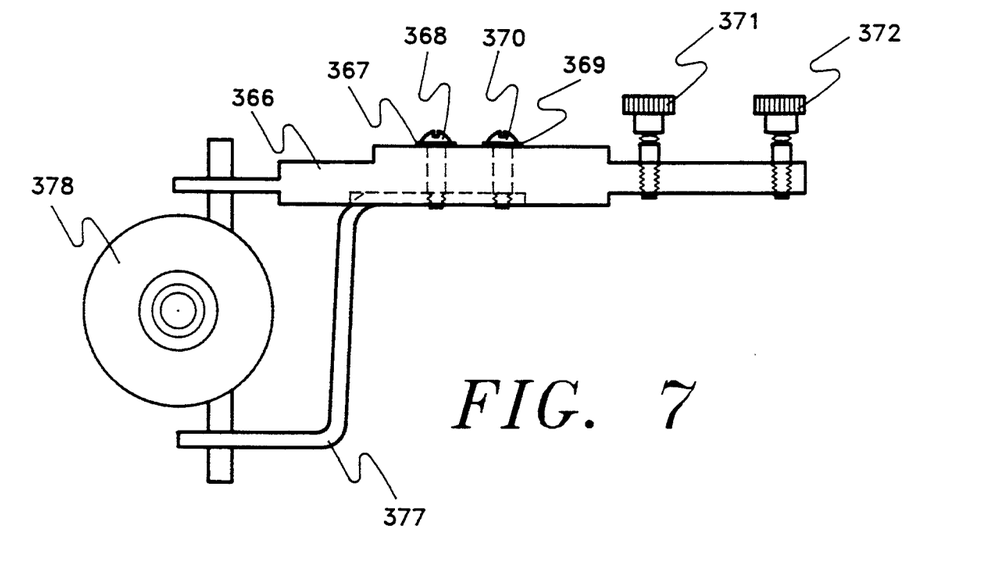
FIG. 7 is a detailed view of the mechanical handle assembly.

As shown in FIG. 7, mechanical handle assembly 392 comprises elements 366 through 374, 377 and 378. Drive shaft rider 378 is a disk shaped object with a threaded hole through it like a nut and possesses two square type rods protruding from it through holes that are located on mechanical handle 366 and coupler 377. Thumb screws 371 and 372 screw into holes that are located on mechanical handle 366.

As shown in FIG. 3, mechanical handle assembly 392 can be moved up or down the length of drive shaft 140 by the rotation of drive shaft 140. Coupler 377 is secured to mechanical handle 366 by screws 368 and 370 and washers 367 and 369. Mechanical handle 366 is secured to mechanical handle coupler 323 by thumb screws 371 and 372. The proper physical orientation between mechanical handle 366 and mechanical handle coupler 323 is maintained by guide pins 373, 374, 375 and 376. This physical orientation is crucial to the proper operation of switches 107 and 115 of water valve assembly 389. The function of mechanical handle assembly 392 is to turn water valve 332 to open and closed positions.

Figure 8:
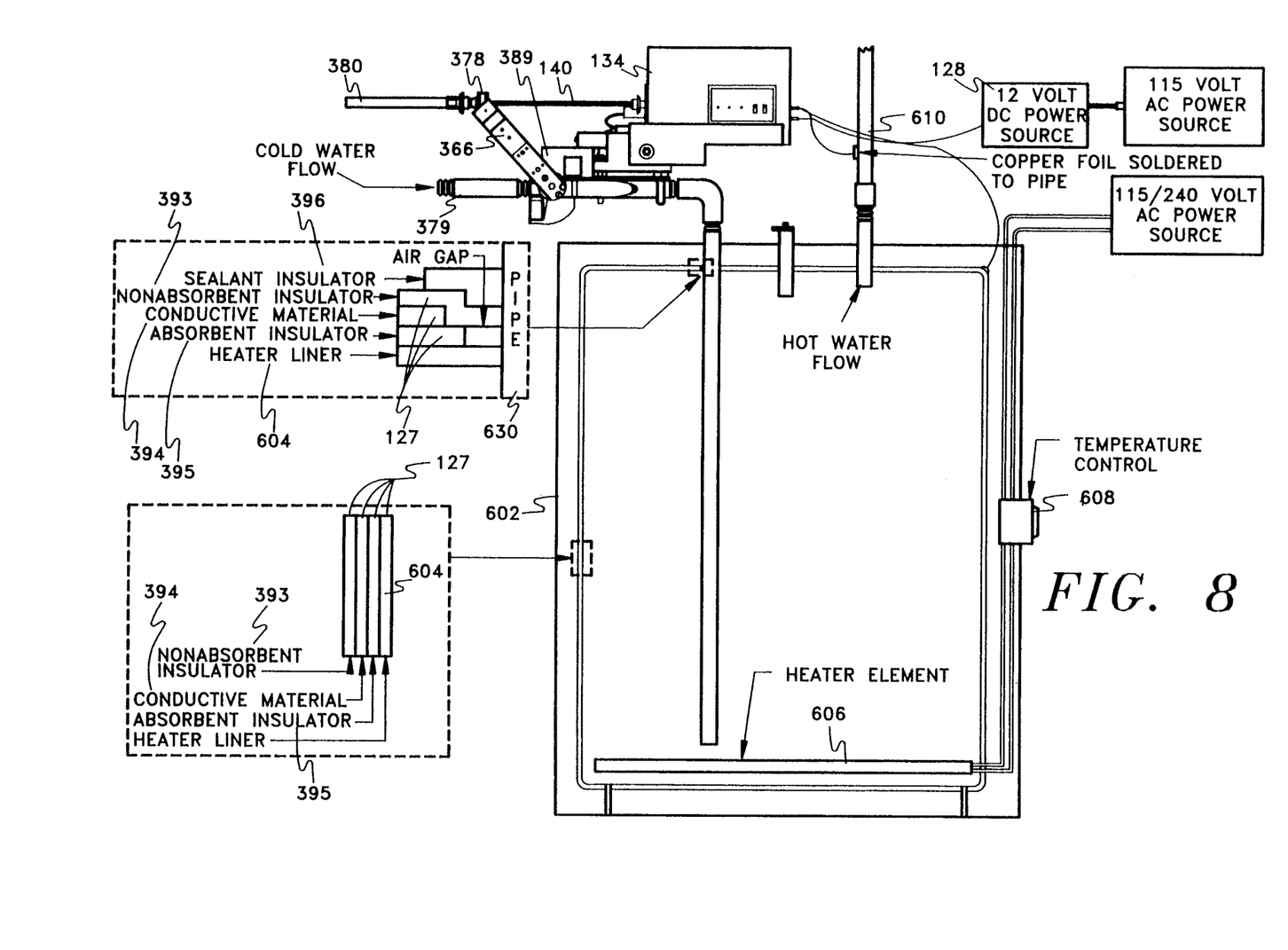
FIG. 8 shows the invention in place on a typical hot water tank.

FIG. 8 shows the invention in place on a typical electric hot water tank 602. The invention is shown attached to cold water pipe 379 that feeds tank 602. The water in tank 602 is heated via heater element 606. The temperature within the tank is controlled by thermostat 608. While the invention is shown with an electric hot water tank, it would function equally was well with a gas-type or any other fuel.

As shown in FIG. 8, sensor 127 comprises elements 393 through 395. Sensor 127 is a multilayered sensor that covers the top, bottom and lateral sides of hot water tank liner 604, thus completely incasing it. Absorbent insulator layer 395 is made of material that conducts electricity only if it has absorbed moisture. Absorbent insulator layer 395 can be made of figerglass insulation material sheeting, cotton cloth or any other material that will provide electrical insulation when it is dry and will absorb moisture leaking from hot water tank liner 604 and become electrically conductive when the leaking moisture is absorbed. Conductive material layer 394 is made of material that has a minimum resistance of 0 ohms to a maximum resistance of 2 Megohms, when a resistance measurement is made at the furthest distant points of conductive material layer 394. For example, from the top of hot water liner 604 to the bottom of said liner. Conductive material layer 394 can be made of copper foil, aluminum foil, 3M ® conductive plastic sheeting, aluminum screening or any other material that will conduct electricity and has a maximum resistance of 2 Megohms.

Nonabsorbent material layer 393 is made of material that is electrically nonconductive when it is wet or dry. Nonabsorbent material layer 393 is employed to keep moisture that is located outside of hot water tank casing 602 from coming in contact with sensor 127 and cause a false alarm. Non absorbent material layer 393 can be made of nonconductive materials like rubber, polyethylene plastic sheeting, vinyl plastic sheeting or shrinkable plastic sheeting like those employed to insulate windows or any other material that is nonabsorbent and is an electrical insulator. Sealant insulator 396 is applied to all areas of sensor 127 where pipes, wires, or other parts must pass through sensor 127 in order for hot water tank 620 to operate. Sealant insulator 396 can be made of RTV sealant, silicone rubber or any other material that will provide a water tight adhesive seal. An air gap is provided to be a conduit for moisture that may leak from the area where hot water tank liner 604 and pipe 630 are connected. The leaking moisture from this connection is channeled to come in contact with absorbent insulator layer 395. Absorbent insulator layer 395 will absorb the leaking moisture and put it in contact with conductive material layer 394. This event will trigger the alarm into action. This concept of air gap channeling of moisture is provided in all areas of sensor 127 where pipes, wires or other parts must pass through hot water tank liner 604.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A leak detection and shut-off apparatus for a liquid container comprising:
   a three layer sensor comprising:
   a first layer, non-absorbent and non-conductive in both wet and dry environments, said first layer furthest from said container, thereby keeping moisture from said sensor and preventing false alarms;

a second layer, contacting said container and substantially encompassing same, non-conductive when dry and conductive when in contact with moisture;

a third layer, sandwiched between said first and second layers, said third layer being conductive having a resistance ranging from 0 to 2 megohms, wherein a leak in said container will cause said sensor to produce a signal corresponding to said leak by completing an electrical circuit through said second and third layers.

2. The leak detection and shut-off apparatus of claim 1 wherein said sensor further comprises an air gap layer adjacent to the region of said container wherein a pipe connection is made to said container, such that moisture that may leak from the pipe connection will be channeled by said air gap layer to said second layer.

3. The leak detection and shut-off apparatus of claim 1 further comprising: shut-off means for mechanically stopping the flow of liquid to said container; warning means for announcing that said container has developed a leak; control means for processing the signal produced by said sensor to activate said warning means and said shut-off means.

4. The leak detection and shut-off apparatus of claim 3 wherein said shut-off means further comprises:

a dc motor;

a rpm to torque gear assembly connected to said dc motor;

a threaded rod drive shaft connected to said gear assembly such that when said dc motor is activated, said threaded rod drive shaft rotates corresponding to the polarity biasing of said dc motor;

a threaded drive shaft rider turnably fastened to said drive shaft;

a valve shut-off assembly attached to said drive shaft rider, wherein a signal from said sensor indicates a leak, causing said dc motor to be activated, said drive shaft rider is moved along said drive shaft thereby causing said valve shut-off assembly to shut off the flow of liquid to said container.

5. The leak detection and shut-off apparatus of claim 4 wherein said warning means further comprises a piezo buzzer, wired to said control means, wherein said a leak in said container, causes said buzzer to be activated producing an audible warning of at least 95 decibels.

6. The leak detection and shut-off apparatus of claim 5 wherein said warning means further comprises telephone dialing means, connected to said control means, for automatically dialing a pre-selected telephone number in response to the detection of a leak by said sensor.

7. The leak detection and shut-off apparatus of claim 6 wherein said warning means further comprises a flashing light.

8. The leak detection and shut-off apparatus of claim 7 wherein said shut-off means further comprises a manual override assembly wherein said drive shaft can be turned by hand to restore liquid flow to said container.

9. The leak detection and shut-off apparatus of claim 8 wherein said control means further comprises:

power source indicator which indicates when battery power has replaced line current as the power source;

low battery indication which indicates that the batteries should be replaced;

test operation mode which simulates a leak in said container to test the operation of said apparatus.

* * * * *